(12) United States Patent
Tsubaki et al.

(10) Patent No.: US 7,683,259 B2
(45) Date of Patent: Mar. 23, 2010

(54) POWER SUPPLY SYSTEM

(75) Inventors: Akira Tsubaki, Shizuoka (JP); Kentaro Shiraki, Shizuoka (JP); Kei Ikeda, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 12/314,994

(22) Filed: Dec. 19, 2008

(65) Prior Publication Data

US 2009/0194327 A1 Aug. 6, 2009

(30) Foreign Application Priority Data

Jan. 31, 2008 (JP) ............... 2008-020513
Jun. 11, 2008 (JP) ............... 2008-152846

(51) Int. Cl.
*H01B 7/06* (2006.01)
(52) U.S. Cl. ................ 174/72 A; 174/68.1; 174/135; 174/72 C; 439/501
(58) Field of Classification Search ........... 174/68.1, 174/68.3, 70 C, 70 R, 72 A, 72 C, 69, 97–99 R, 174/135; 439/501, 502, 162; 361/826; 248/629; 296/149, 152; 138/111, 157, 158
See application file for complete search history.

(56) References Cited

U.S. PATENT DOCUMENTS

| | | | | |
|---|---|---|---|---|
| 7,390,968 B2 * | 6/2008 | Kogure et al. | ............. | 174/72 A |
| 7,482,538 B2 * | 1/2009 | Kisu et al. | ................ | 174/72 A |
| 7,534,959 B2 * | 5/2009 | Kogure et al. | ............. | 174/72 A |
| 2002/0005014 A1 | 1/2002 | Doshita et al. | | |

FOREIGN PATENT DOCUMENTS

| | | |
|---|---|---|
| EP | 1 783 875 | 5/2007 |
| JP | 2001-354085 | 12/2001 |
| JP | 2006-050841 | 2/2006 |
| JP | 2006-320145 | 11/2006 |

\* cited by examiner

*Primary Examiner*—Dhiru R Patel
(74) *Attorney, Agent, or Firm*—Edwards Angell Palmer & Dodge LLP

(57) ABSTRACT

For improving durability of a wiring harness of a power supply system used in a sliding structure, a power supply system includes a casing; a wiring harness; a harness supporter arranged along a base of the casing so as to move freely back-and-forth in the casing; and a constant force spring arranged along the base of the casing. The wiring harness is bent and wired along an outer surface of the harness supporter, and the harness supporter is biased with a spring force by the constant force spring so as to absorb an extra length of the wiring harness. A winding part of the constant force spring is separated from a harness receiving space of the casing, and an end of the constant force spring led from the winding part is connected and fixed to the harness supporter at an outside of the casing.

1 Claim, 7 Drawing Sheets

POWER SUPPLY SYSTEM

CROSS REFERENCE TO RELATED APPLICATIONS

This application is on the basis of Japanese Patent Applications No. 2008-020513 and 2008-152846, the contents of which are hereby incorporated by reference.

BACKGROUND OF THE INVENTION

1. Field of the Invention

The present invention relates to a power supply system absorbing an extra length of a wiring harness by using a constant force spring for supplying continuously electric power, for example to a sliding door of a vehicle.

2. Description of the Related Art

FIGS. 11A, 11B show an embodiment of a conventional power supply system (for example, see Patent Document 1).

The power supply system is fixed vertically in a sliding door 41 of a vehicle, and includes a protector (casing) 50 made of synthetic resin for receiving a wiring harness 43 to be bent freely, and a metallic flat spring 44 forcing the wiring harness 43 upwardly in the protector so as to absorb an extra length of the wiring harness 43 by forcing the wiring harness toward a curved surrounding wall 54 along a vertical wall 53 of the protector 50 by a force of the flat spring 44.

The wiring harness 43 is wired from a long bottom opening 55 of the protector 50 through a traversing area 46 to a harness fixer 60 in the vicinity of a step 48 of a vehicle body 47 so as to move swingably back-and-forth in a front-rear direction of the vehicle. Electric wire portion 43a at one side of the wiring harness is led from a front side of the protector 50 to a side of the sliding door for continuously supplying power to an electric apparatus and an auxiliary apparatus (not shown) at the side of the sliding door.

The protector 50 is structured by a protector base 51 and a protector cover 52. After mounting the wiring harness 43 and the flat spring 44 inside the protector 50, the protector base 51 and the protector cover 52 are locked and fixed with each other.

The flat spring 44 is fixed in a bottom area at a front-end of the protector 50 together with the wiring harness 43 (fixed portion of the flat spring is marked with "59"). A plastic cap 49 is fixed at an end of the flat spring 44. The wiring harness 43 is supported slidably by the cap 49.

The wiring harness 43 is formed by covering a plurality of electric wires 43a with a plastic corrugate tube 43b. An end of the corrugate tube 43b is fixed with an adhesive tape in the bottom area at the front end of the protector 50. The corrugate tube 43b is formed by arranging alternately ribs and groves like bellows so as to have a good flexibility. The each electric wire 43a of the wiring harness 43 in the traversing area 46 is safely protected by the corrugate tube 43b from outer interference, water drops, and dust.

FIG. 11A shows the sliding door 41 in a complete close condition. FIG. 11B shows the sliding door 41 in a half-open condition nearing a full-open condition. When the sliding door 41 is in the complete close condition, the wiring harness 43 is pulled backwardly. When the sliding door 41 is in the full-open condition, the wiring harness 43 is pulled forwardly. When the sliding door 41 is in the half-open condition, the wiring harness 43 tends to droop downwardly, but the wiring harness 43 is forced upwardly by the flat spring 44, so that a slack (an extra length) of the wiring harness 43 is absorbed and catching of the wiring harness caused by drooping is prevented.

FIG. 12 shows another embodiment of the conventional power supply system (see Patent Document 2).

The power supply system 61 for supplying power continuously to a sliding door or a sliding seat (not shown) of a vehicle, which have a long sliding length, includes a long slim casing 62 having a long narrow first guide slit 63 and a long narrow second guide slit 67, a pulley 64 moving back and forth along the first guide slit 63, a long compression spring 66 biasing the pulley 64 through a block 65 along the first guide slit 63, and a slider 68 moving back-and-forth along the second guide slit 67. One end 69a of the wiring harness 69 is fixed at the casing 62 and led to an outside of the casing 62. A middle area of the wiring harness 69 is formed into a U-shape along the pulley 64. The other end 69b of the wiring harness 69 is led to the outside of the casing 62 through the slider 68.

When the power supply system 61 is installed vertically at the sliding door, the one end 69a of the wiring harness at a fixed side is arranged at the sliding door and the other end 69b of the wiring harness at a movable side is arranged at a vehicle body. When the power supply system 61 is applied at the sliding seat, the power supply system 61 is arranged vertically or horizontally at a floor of the vehicle body, and the one side 69a of the wiring harness at the fixed side is arranged at the vehicle body, and the other end 69b of the wiring harness at the movable side is arranged at the sliding seat.

A power supply system, which uses a compression spring formed into a wave-shape by bending a flat spring instead of the compression coil spring 66, similar to the power supply system shown in FIG. 12 is disclosed in Patent Document 3.

[Patent Document 1] Japanese Published Patent Application No. 2001-354085 (FIGS. 4 and 7)

[Patent Document 2] Japanese Published Patent Application No. 2006-50841 (FIG. 2)

[Patent Document 3] Japanese Published Patent Application No. 2006-320145 (FIG. 1)

SUMMARY OF THE INVENTION

Objects to be Solved

When the power supply system 42 shown in FIGS. 11A, 11B is installed on a small vehicle, the protector (casing) 50 occupies a large area, so that flexibility of laying out the other auxiliary apparatuses is limited. In case that the sliding length of the sliding door 41 is large (i.e. the extra length of the wiring harness is long), there is a problem that a height of the protector 50 increases.

When the power supply system 61 shown in FIG. 12 is installed on a sliding structure (the sliding door or the sliding seat) with a relatively small sliding length so as to shorten the casing 62 and the compression spring 66, changing of a spring force corresponding to deformation of the compression spring 66 becomes large. Thereby, an unexpected strong spring force generated at some positions of deformation of the compression spring 66 pushes strongly the wiring harness 69, and it may cause reducing durability of the wiring harness 69.

This strong spring force loads on the sliding structure and operating forces for opening and closing the sliding structure is increased, so that operatability of the vehicle may become worse. When trying to make the change of spring force of the compression spring for overcoming above problems, a whole length of the compression spring 66 must be extended. The extended compression spring 66 increases a size of the casing 62 receiving the compression spring, thereby it will become difficult to install the power supply system in a vehicle.

Further, when the springs 44, 66 of FIGS. 11A, 11B and 12 are broken at the worst, cutting edges of the broken springs 44, 66 may damage the protect tube 43b of the wiring harness 43.

According to the above problems, an object of the present invention is to provide a power supply system, which can eliminate generation of an unnecessary strong spring force during sliding operation of a sliding structure, and improve durability of a wiring harness pressed by the spring force and operability of the sliding structure, and additionally can miniaturize the sliding structure and can easily attain a spring having a required spring force, and further additionally can prevent the wiring harness from being damaged when the spring is broken at the worst.

How to Attain the Object of the Present Invention

In order to attain the object, according to the present invention, as shown in a basic configuration view of FIG. 1, there is provided a power supply system including: a casing; a wiring harness; a harness supporter arranged along a base of the casing so as to move freely back-and-forth in the casing; and a constant force spring arranged along the base of the casing, wherein the wiring harness is bent and wired along an outer surface of the harness supporter, and the harness supporter is biased with a spring force by the constant force spring so as to absorb an extra length of the wiring harness, and wherein a winding part of the constant force spring is separated from a harness receiving space of the casing, and an end of the constant force spring led from the winding part is connected and fixed to the harness supporter at an outside of the casing.

According to the above, the wiring harness is positioned at an inside of the casing, and the constant force spring is positioned at an outside of the casing. Thus, the constant force spring is separated from the wiring harness. Therefore, if the constant force spring is cracked or broken, the constant force spring does not interfere with the wiring harness, and the wiring harness is prevented from being damaged.

These and other objects, features, and advantages of the present invention will become more apparent upon reading of the following detailed description along with the accompanied drawings.

DETAILED DESCRIPTION OF THE PREFERRED EMBODIMENTS

Figure 1:
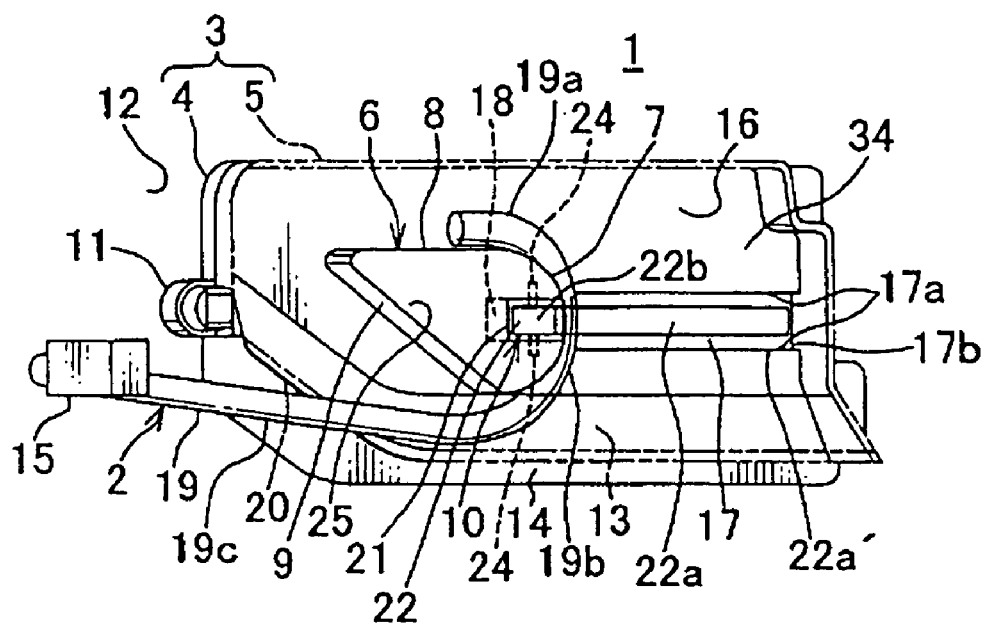
FIG. 1 is a perspective view of an embodiment of a power supply system according to the present invention.
Figure 2:
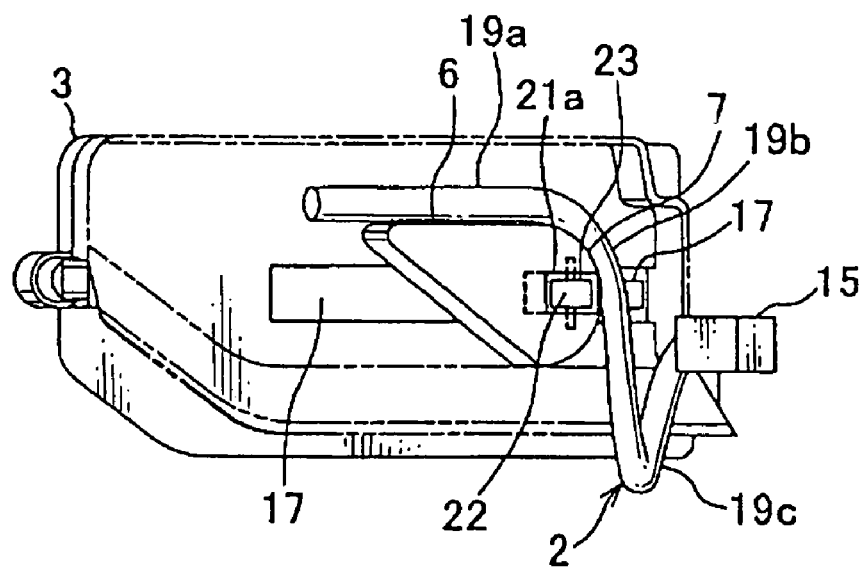
FIG. 2 is a perspective view of the power supply system shown in FIG. 1 absorbing an extra length of a wiring harness.

FIGS. 1, 2 show an embodiment of a power supply system according to the present invention.

The power supply system 1 includes a plastic casing 3, a wiring harness 2 bent and arranged movably in the casing 3, a harness supporter 6 having a curved surface 7 providing the wiring harness 2 thereon and being arranged so as to move freely back-and-forth in the casing 3, and a constant force spring 22 biasing the harness supporter 6 so as to absorb an extra length of the wiring harness.

The casing 3 is formed with a base 4 and a cover 5 (shown with a two-dot chain line). The base 4 and the cover 5 are fixed to each other by a lock device (not shown). The casing 3 includes a harness receiving space 34 surrounded by the base 4 and the cover 5. The base 4 is fixed by a bracket 11 on a door inner panel 12 of a sliding door of a vehicle. A bottom end portion of the cover 5 is curved toward an inside of a vehicle. A long bottom opening 14 is provided between an inside of a curved portion 13 and the base 4. The wiring harness 2 is led from the bottom opening 14 toward a harness lock 15 at a vehicle body side so as to move freely back-and-forth.

A wide guide groove 17 as a horizontal guide rail is provided at a central area in a vertical direction of a vertical base plate 16 of the base 4. A slider 18 of the harness supporter 6 engages slidably with the guide groove 17. The guide groove 17 is extended from a front end of the base plate 16 to a middle point in a lengthwise direction of the base plate 16. The guide groove 17 has recesses (not shown) respectively at upper and lower edges 17a. Upper and lower ends of the slider 18 engage slidably with the recesses.

The slider 18 is formed into a rectangular plate shape, and inserted from a front end 17b into the guide groove 17. At upper and lower ends of the slider 18, thin rollers (not shown) for sliding can be arranged. The slider 18 is arranged integrally or separately to project from a rear surface of the harness supporter 6. The rear surface of the harness supporter 6 slides freely on the base plate 16 of the base 4.

The harness supporter 6 is a plate having a thickness same as an outer diameter of a corrugate tube 19 of the wiring harness 2. At a front end of the harness supporter 6, the curved surface 7 is formed into a half circular shape. A top end of the curved surface 7 continues to an upper horizontal straight surface 8 of the harness supporter 6. A bottom end of the curved surface 7 continues to a lower upward-slant (rear-side up) surface 9 of the harness supporter 6. The straight surface 8 and the slant surface 9 intersect to each other at a rear end of the harness supporter 6.

An upper portion 19a of the wing harness 2 is arranged along the straight surface 8 at the upper side of the harness supporter 6, and fixed by a fixing device like a adhesive tape or a wire band at a narrow opening (not shown) at a rear side of the casing 3, and wired along the door inner panel 12 so as to be connected to an auxiliary device (not shown) at the sliding door by a connector.

As shown in FIG. 1, the wiring harness 2 is bent into a U-shape along the curved surface 7 at the front side of the harness supporter 6. The upper portion 19a of the wiring harness 2 at a fix side continues through a harness bend portion 19b to a lower portion 19c. As shown in FIGS. 1, 2, the lower portion 19c moves freely back-and-forth along the bottom opening 14 of the casing 3 between the sliding door and the harness lock 15 at the vehicle body side. The lower portion of the wiring harness 2 is connected through the harness lock 15 to a vehicle-body side wiring harness (not shown). The lower slant surface 9 of the harness supporter 6 corresponds to an upward slant (rear-side up) 20 at a rear bottom side of the casing 3.

A rectangular opening 21 is provided at the front portion of the harness supporter 6 to penetrate in a direction of a thickness of the harness supporter 6. The constant force spring unit 10 is located in the opening 21. A strip-shape straight portion 22a of the constant force spring 22 led forwardly out from a winding part 22b of the constant force spring 22 is arranged along a bottom surface of the guide groove 17 (an inner surface of the base plate 16 of the base 4). A thickness direction of the straight portion 22a corresponds to a thickness direction of the base plate 16 (a width direction of the straight portion is vertical). A top end 22a' of the straight portion 22a is fixed at a front side 17b of the guide groove 17 on the bottom surface by a fixing device (not shown) like a screw or a hook. The straight portion 22a is arranged along a moving track of the harness supporter 6. The constant force spring 22 in this embodiment is a spiral spring by winding a strip steel sheet spirally. The constant force spring has a very small force change with respect to an expansion or contraction stroke. The harness supporter may be referred to as a harness guiding member.

Figure 3:
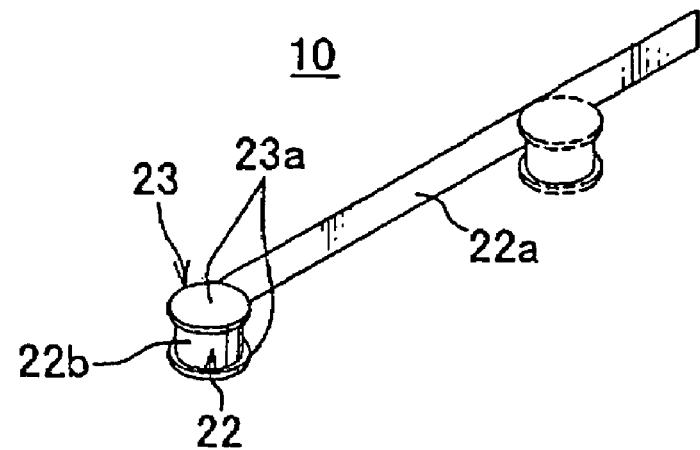
FIG. 3 is a perspective view of an embodiment of a constant force spring unit.

An embodiment of the spring unit 10 is shown in FIG. 3. The spring unit 10 includes a plastic reel 23 and a metallic constant force spring 22 wound around the reel 23. The reel 23 is formed with upper and lower disks 23a, and a shaft (not shown) perpendicular to the disks 23a and connecting the disks 23a.

A base end of the constant force spring 22 is fixed to the shaft of the reel 23 so as to wind the winding part 22b of the constant force spring 22 spirally around the shaft. The constant force spring 22 tends to be restored into the spiral shape by own elastic restoring force. The constant force spring 22 is led in a strip shape from the reel 23 against the elastic restoring force to form the straight portion 22a.

A solid line in FIG. 3 shows the constant force spring 22, the straight portion of which is pulled long. A two-dot chain line in FIG. 3 shows the constant force spring 22, the straight portion of which is pulled short. The constant force spring 22 has a substantially constant elastic force for any pulled length. In the both cases of pulled-long and pulled-short, the restoring force is always constant. The force pulling the constant force spring 22 in an initial condition from the reel 23 and the force further pulling the constant force spring 22 in the pulled-short condition are substantially same. The constant force spring 22 restores to be wound around the reel 23 with its own restoring spring force.

As shown in FIG. 1, upper and lower pivots 24 are formed projectingly and coaxially from the upper and lower disks 23a integrally with or separately from the shaft (not shown) in the center of the reel 23. The upper and lower pivots 24 are supported rotatably by horizontal upper and lower inner walls 21a (FIG. 2) in the opening 21 of the harness supporter 6. For example, upper and lower bearings (not shown) are extended from the opening 21 on a vertical front wall 25 of the harness supporter 6. When a groove cover (not shown) is closed while the pivots 24 are inserted into the bearings, the pivots 24 are rotatably supported in the bearings.

When an outer diameter of the reel 23 of the spring unit 10 is formed larger than a thickness of the harness supporter 6, the reel 23 can slightly project from the opening 21 of the harness supporter 6 toward the cover 5 of the protector 3. A part of outer surface of the reel 23 (FIG. 3) of the spring unit 10 can be positioned in the guide groove 17 at the base 4 of the protector 3. A slider 18 is arranged at a rear side of the opening 21. The extended contact force spring 22 is located in the guide groove 17 at a front side of the slider 18. Therefore, the thickness of the constant force spring 22 is received in the power supply system 1 and the spring unit can be thinner. Further, the harness supporter 6 and the slider 18 can slide smoothly.

In this embodiment, the wiring harness 2 is structured by covering the plurality of covered electric wires (not shown) with the corrugate tube 19 having oval or round cross-section. Instead of the corrugate tube 19, a meshed tube (not shown) can be used or, eliminating the protection tube, the plurality of electric wires can be bundled partially.

Hereafter; an operation of the power supply system 1 will be described with reference to FIGS. 1 to 3.

In FIG. 1, the sliding door at a left side of the vehicle is slid forward to a complete close condition. The harness supporter 6 is positioned at a rear side of the guide groove 17, and the constant force spring 22 is extended in a strip shape. The wiring harness 2 is bent back along the curved surface 7 at the front end of the harness supporter 6, and extends straightly toward the harness lock 15 at the vehicle body.

Figure 4:
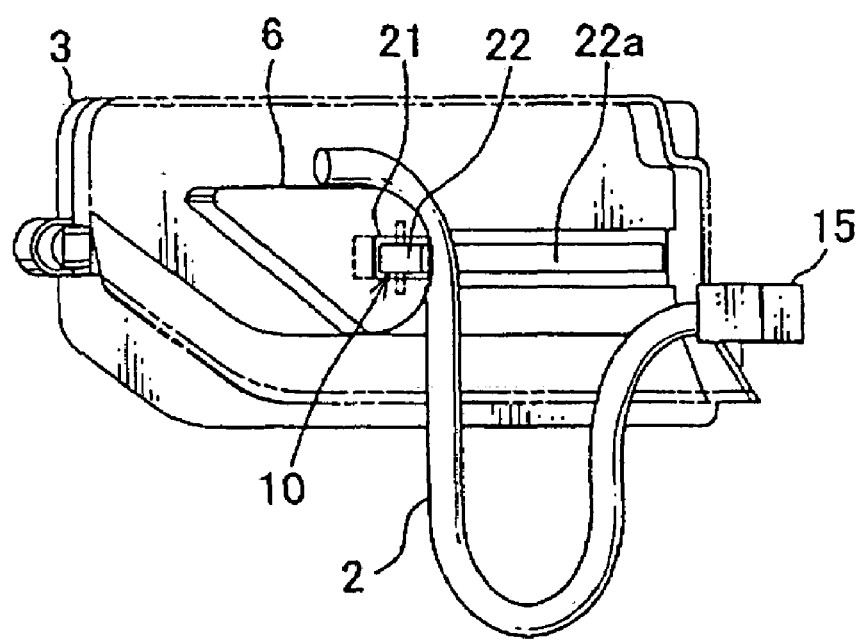
FIG. 4 is a perspective view of drooping of the wiring harness of the power supply system shown in FIG. 1.

As the sliding door is slid rearward from the complete close position to the open position and in a middle way in a half-open position, the wiring harness 2 tends to droop as shown in FIG. 4. However, the harness supporter 6 moves slidingly along the guide groove 17 as shown in FIG. 2 by the restoring force of the extended constant force spring 22 restoring to a spiral shape. Thereby, the wiring harness 2 is pushed along the curved surface 7 so as to absorb the extra length. In FIG. 1, the wiring harness 2 is pulled forward in the casing 3 by the constant force spring 22.

In the half-open condition of the sliding door, the harness supporter 6 is positioned in a middle area in a lengthwise direction of the guide groove 17. When the sliding door moves further to the open position, the harness supporter 6 is positioned by the spring force of the constant force spring 22 so as to absorb the extra length by an action of opening the sliding door. Therefore, the spring force to absorb the extra length may be substantially constant. It is suitable to use the constant force spring 22 for it. When the sliding door moves from the full-open position to the complete close position, the similar actions are provided.

The sliding door in the full-open condition is shown in FIG. 2. The harness supporter 6 is positioned at the front end of the guide groove 17, and the constant force spring 22 is almost wound in the reel 23 so as to project forward shortly. Winding action of the constant force spring 22 is naturally performed by own restoring force. Because the front end 22a' of the contact spring force 22 is fixed to the casing 3, the constant force spring 22 has spring force to move the harness supporter 6 against a self-weight of the wiring harness 2.

The spring force of the constant force spring 22 between the complete close position in FIG. 1 and the full open position in FIG. 2 is substantially constant. Thereby, the operating force for opening the sliding door is almost constant. When automatic sliding door is applied, a driving motor (not shown) is required a small power and the motor driving can be miniaturized. The bend portion 19b of the wiring harness 2 is pushed forward with the constant force by the curved surface 7 of the harness supporter 6, so that the wiring harness 2 is prevented from an excessive large force and deformation and damage.

Similarly, from the full-open position in FIG. 2 to the complete close position in FIG. 1 of the sliding door, the spring force of the constant force spring 22 is constant. Thereby, operating force of closing the sliding door is almost constant, so that the operatability is good. When automatic sliding door is applied, a driving motor is required a small power and the motor driving can be miniaturized. The bend portion 19b of the wiring harness 2 is pushed rearward with the constant force by the curved surface 7 of the harness supporter 6, so that the wiring harness 2 is prevented from an excessive large force and deformation and damage.

In this embodiment, the reel 23 (FIG. 3) is used in the spring unit 10. However, the constant force spring 22 can be received spirally in the casing 3 without using the reel 23. Further, a pivot (24) may be used instead of the disk 23a of the reel 23, and a base end of the winding part 22b of the constant force spring 22 may be fixed to the pivot.

In this embodiment, the constant force spring 22 to be extended in a strip shape is used. However, as the constant force spring, for example, a coil spring to be extended in a line can be used. In this case, a line shaped spring has a shape memory, and is wound around a shaft of the reel 23 with own resilient force.

In this embodiment, the harness supporter 6 is formed into a U-shape. However, the harness supporter 6 can be formed into another shape, for example a circular shape, a semicircle shape or a semicircle front half and rectangular rear half shape. In a circular shape, a not-shown ring part (harness receiving part) at an outer circumference may be rotatable in a pulley shape.

In this embodiment, the power supply system 1 is applied for a sliding door of a vehicle. However, the power supply system 1 can be also applied to a sliding door of other moving objects or other apparatus. The power supply system 1 also can be applied to a sliding seat of the vehicle.

When the power supply system 1 is applied to the sliding seat, the casing 3 is placed horizontally on a floor (not shown) of the vehicle body, the upper portion 19a of the wiring harness 2 is connected to the wiring harness (not shown) at the vehicle body, the lower portion 19c of the wiring harness 2 is connected to the auxiliary device at the sliding seat.

Figure 12:
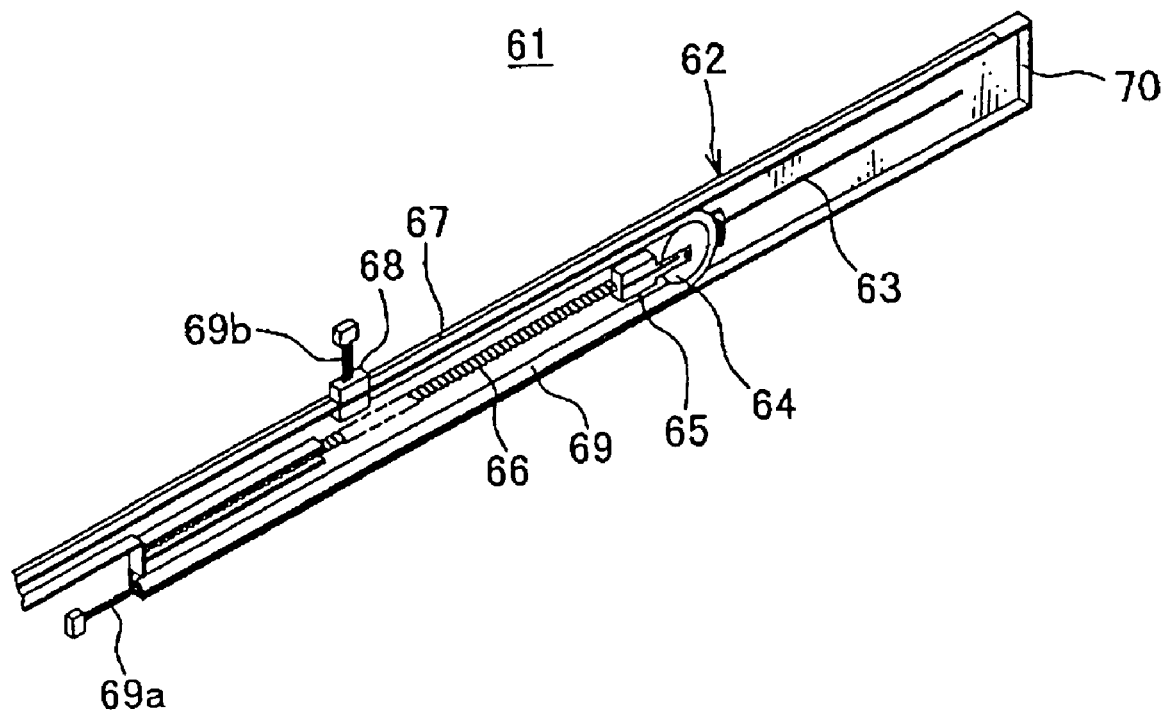
FIG. 12 is a perspective view of another embodiment of the conventional power supply system.

The long opening 14 of the casing 3 is provided at the base plate 16 of the cover 5. The slider 68 is engaged slidably with the long opening 67 as shown in FIG. 12 as prior art, and the lower portion 19c is led out from the slider 68. When the casing 3 is arranged vertically, inverting the power supply system 1 in FIG. 1 up-side-down, a long opening 67 is arranged at a narrow top wall of the casing 3 as shown in FIG. 12, and the slider 68 is engaged with the opening 67 and the lower portion 19c of the wiring harness 2 is led out from the slider 68.

The prior art shown in FIG. 12 can use the constant force spring 22 instead of the compression spring 66 so as to fix the spring unit 10 at the block 65 in FIG. 12 and lead the end of the constant force spring 22 like a strip from the spring unit 10 toward the front wall 70 of the casing 62 in a counter direction of the compression coil spring 66.

In the embodiment shown in FIG. 1, the spring unit 10 is mounted at the harness supporter 6. However, the spring unit 10 can be fixed at the front end of the casing 3 so as to pull the constant force spring 22 rearward from the spring unit 10 to the harness supporter 6 at the rear side and fix the end 22a' of the constant force spring 22 at the harness supporter 6. In this case, a center rotating shaft (not shown) slidably can support the harness supporter 6 in a roller (pulley) shape in a long guide hole (not shown) of the casing 3, and the end 22a' of the constant force spring 22 can penetrate and be fixed to the rotating shaft. This configuration can attain the same effect as those in FIGS. 1 to 4. However, in this case, an effect to arrange the spring unit 10 in a narrow space provided by using the inner space of the harness supporter 6 in the embodiment shown in FIG. 1 is eliminated.

Further, width dimensions of the casing 3 and the harness supporter 6 in a vertical direction may be miniaturized as much as possible, and the case may be arranged not vertically but horizontally at the vehicle body side to wire the wiring harness 2 from the vehicle body side to the slide door side. Further, the configuration according to the present invention as described above can be adopted not only to the power supply system 1 but also to a power supply structure, or a harness wiring structure.

Figure 6A:
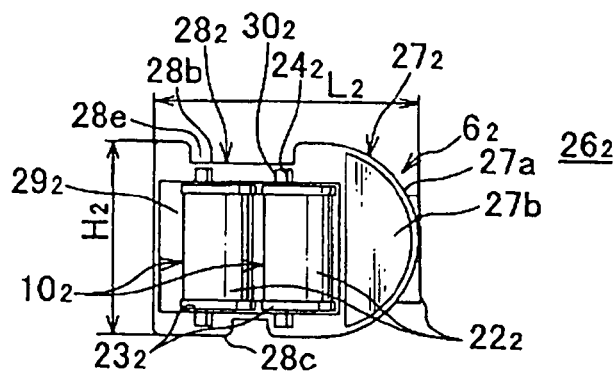
FIG. 6A is a front view of a second embodiment of the harness supporter and the constant force spring in the power supply system shown in FIG. 1.
Figure 6B:
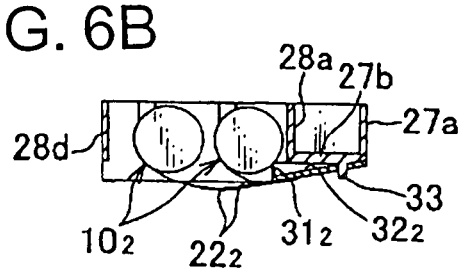
FIG. 6B is a horizontal cross-sectional view of the harness supporter and the constant force spring shown in FIG. 6A.
Figure 7A:
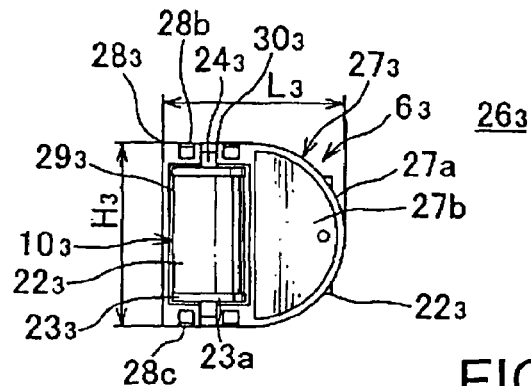
FIG. 7A is a front view of a third embodiment of the harness supporter and the constant force spring in the power supply system shown in FIG. 1.
Figure 7B:
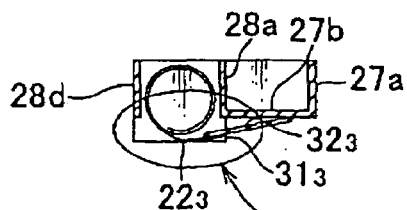
FIG. 7B is a horizontal cross-sectional view of the harness supporter and the constant force spring shown in FIG. 7A.
Figure 7B:
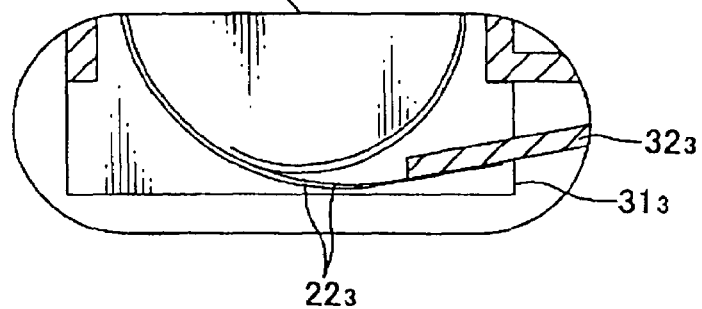

FIGS. 5 to 7 show other embodiments of changing the harness supporter 6 and the constant force spring 22 (spring unit 10) in the power supply system 1 in FIG. 1. Constant force springs $22_1$ to $22_3$ assembled in respective spring units $10_1$ to $10_3$ are mounted in respective harness supporter $6_1$ to $6_3$. The harness supporters $6_1$ to $6_3$ and the spring units $10_1$ to $10_3$ compose absorbing units $26_1$ to $26_3$ of the power supply system 1.

Figure 5A:
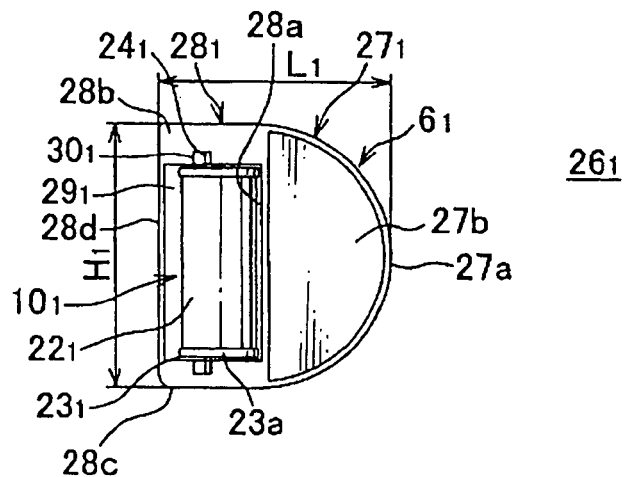
FIG. 5A is a front view of a first embodiment of a harness supporter and a constant force spring in the power supply system shown in FIG. 1.
Figure 5B:
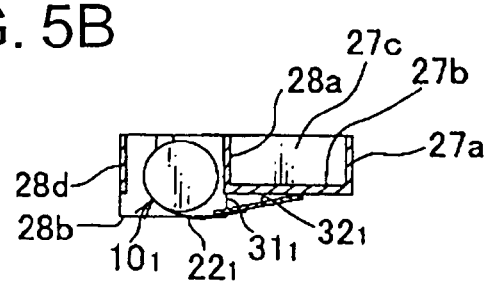
FIG. 5B is a horizontal cross-sectional view of the harness supporter and the constant force spring shown in FIG. 5A.

In the absorbing unit $26_1$ shown in FIGS. 5A, 5B, the harness supporter $6_1$ is formed into a U-shape, and a width of the constant force spring $22_1$ is designed slightly smaller than a width $H_1$ of the harness supporter $6_1$.

The harness supporter $6_1$ is structured with a half-circular front half portion $27_1$ and a rectangular rear half portion $28_1$. The front half portion $27_1$ has a circular curved outer side wall 27a and a rear wall 27b continued and perpendicular to an edge of the outer side wall 27a. The outer side wall 27a and the rear wall 27b continue to a middle side wall 28a of a rectangular box portion $28_1$. A space 27c is surrounded by the middle side wall 28a, the outer side wall 27a and the rear wall 27b.

As similar to the embodiment shown in FIG. 1, the wiring harness 2 is bent and curved into a U-shape along the outer side wall 27a of the front half portion $27_1$. The upper and lower portions 19a and 19c continued to the bend portion 19b (shown in FIG. 1) are arranged along upper and lower side walls 28b, 28c of the rear half portion $28_1$.

The rear half portion $28_1$ includes a rectangular through space $29_1$ surrounded by the middle side wall 28a, a rear side wall 28d and the thick upper and lower side walls 28b, 28c. The spring unit $10_1$ is received in the through space $29_1$. The upper and lower side walls 28b, 28c are taller than the middle side wall 28a and the rear side wall 28d. The spring unit $10_1$ is received within a wall height of the upper and lower side walls 28b, 28c. Sliders (not shown) engaged with the guide groove 17 of the casing 3 in FIG. 1 are provided at the upper and lower side walls 28b, 28c. Grooves $30_1$ for receiving upper and lower pivots $24_1$ of the spring unit $10_1$ are provided at the upper and lower side walls 28b, 28c.

The pivots $24_1$ project outwardly from the centers of the upper and lower disks 23a of the reel $23_1$. The base end (not shown) of the constant force spring $22_1$ is supported at the shaft (not shown) connecting the both disks $23a$. Instead of the shaft, it is possible by extending the base end of the constant force spring $22_1$ in both upward and downward directions to fix the base end at inner sides of the upper and lower side walls $28b$, $28c$.

An opening $31_1$ is arranged at a front side of extensions of the upper and lower side walls $28b$, $28c$ in a same vertical plane of the middle side wall $28a$ of the rectangular rear half portion $28_1$. The constant force spring $21_1$ is pulled against the spring force forwardly from the opening $31_1$ along the rear wall $27b$ of the half-circular portion $27_1$. A plate $32_1$ is fixed with screws at the top end of the constant force spring $22_1$ on a rear surface of the base plate $32_1$. The plate $32_1$ is fixed by heat welding at the front end of the guide groove 17 of the base plate 16 of the casing 3 in FIG. 1. In FIG. 5, the constant force spring $22_1$ is wounded up, and the plate $32_1$ is extended from the opening $31_1$ to the rear wall $27b$.

For miniaturize a height H1 of the harness supporter $6_1$ in FIG. 5, an absorbing unit $26_2$ shown in FIGS. 6A, 6B has two spring units $10_2$, each of which includes a constant force spring $22_2$ having a half width of the constant force spring $22_1$ in FIG. 5, arranged successively along a moving direction. Two constant force springs $22_2$ are used in parallel, so that total spring force will be same as the spring force of the constant force spring $22_1$ in FIG. 5.

Each spring unit $10_2$ has a diameter of a reel $23_2$ and a diameter of the constant force spring $22_2$ substantially same as those of the reel $23_1$ and the spring $22_1$ in FIG. 5. (A length of the constant force spring at the front side spring unit is a little shorter than that of the rear side spring unit.)

The harness supporter $6_2$ is formed with a half-circular front half portion $27_2$ and a rectangular rear half portion $28_2$. The front half portion $27_2$ has a side wall $28a$ and a rear wall $27b$. The rear half portion $28_2$ has a through space $29_2$ for receiving the spring unit $10_2$. Heights of upper and lower side walls $28b$, $28c$ are larger than that of front and rear side walls $28a$, $28d$ of the space $29_2$. Two constant force springs $22_2$ to be overlapped with each other are pulled forwardly from the front opening $31_2$. The harness supporter $6_2$ has similar basic structure as shown in FIG. 5. At the upper and lower side walls $28b$, $28c$, grooves $30_2$ receiving pivots $24_2$ of the each reel $23_2$ are provided. Each spring unit $10_2$ is received within the heights of the upper and lower side walls $28b$, $28c$ in the space $29_2$.

In the embodiment shown in FIG. 6, upper and lower recesses $28e$ are formed in a middle area of the rear half portion $28_2$ so as to arrange the wiring harness 2 from the half-circular portion $27_2$ along the upper and lower surfaces of the rectangular portion $28_2$ with a small contact surface. At the rear half portion $28_2$, a slider (not shown) engaging with the guide groove 17 shown in FIG. 1 is provided. The plate $32_2$ is fixed at top ends of two constant force springs $22_2$. Top ends of both constant force springs $22_2$ are disposed at a rear wall side of the plate $32_2$. A projection 33 for temporarily holding a hole of the plate $32_2$ is provided on the rear wall $27b$ of the front half portion $27_2$. When the absorbing unit $26_2$ is assembled in the casing 3 (FIG. 1), by removing the plate $32_2$ from the projection 33 and pulling the constant force springs $22_2$, the plate $32_2$ is fixed on the base plate 16 (FIG. 1).

A longitudinal length L2 of the harness supporter $6_2$ in FIG. 6A is the same or slightly longer than the longitudinal length L1 of the harness supporter $6_1$ in FIG. 5A. A length L3 of the harness supporter $6_3$ in FIG. 7A can be shorter than the length L2 of the harness supporter $6_2$ in FIG. 6A by winding two constant force springs $22_3$ overlapped with each other in a thickness direction around the reel $23_3$. Thus, the harness supporter $6_3$ may be further miniaturized than the harness supporter $6_1$ in FIG. 5A in both height and length directions.

The harness supporter $6_3$ has a basic structure same as the embodiment in FIGS. 5A. The harness supporter $6_3$ includes a half circular front half portion $27_3$ and a rectangular rear half portion $28_3$. The rear half portion $28_3$ has a through space $29_3$ for receiving a spring unit $10_3$. Upper and lower side walls $28b$, $28c$ are provided with grooves $30_3$ for receiving pivots 243 at outer sides of the reel $23_3$ and a slider (not shown) engaging with the groove guide 17 in FIG. 1. The spring unit $10_3$ is received within the heights of the upper and lower side walls $28b$, $28c$.

The side wall $27a$ and the rear wall $27b$ of the front half portion $27_3$ continue to a middle side wall $28a$ of the rear half portion $28_3$. The middle side wall $28a$ and the rear side wall $28d$ face each other in parallel. Two constant force springs $22_3$ are pulled from an opening $31_3$ on the same vertical plane of the middle side wall $28a$. Ends of the two constant force springs $23_3$ are fixed on a rear surface of a plate $32_3$. While the plate $32_3$ is held temporarily at the rear wall $27b$, the tow constant force springs are pulled forward smoothly from the opening $31_3$.

Base ends (not shown) of the two constant force springs $22_3$ are held at a shaft (not shown) of the reel $23_3$ or at inner surfaces of the disks $23a$ of the reel $23_3$. According to the embodiment shown in FIGS. 7A, 7B, both of the height and the length of the absorbing unit $26_3$ can be miniaturized comparing with the absorbing unit $26_1$ in FIGS. 5A, 5B.

In the embodiment shown in FIGS. 6A, 6B, when the rectangular space $29_2$ for receiving each reel $23_2$ is extended into an inside of the half circular front half portion $6_2$, the length of the harness supporter $6_2$ can be the same or less than that of the harness supporter $6_1$ in FIGS. 5A, 5B.

In each embodiment shown in FIGS. 5A, 5B, 6A, 6B, 7A and 7B, the rear wall $27b$ of the harness supporter $6_1$ to $6_3$ is positioned along the base plate 16 of the base 4 of the casing 3 in FIG. 1, and the end of the constant force spring $22_1$ to $22_3$ is extended between the base plate 16 and the rear wall $27b$ and fixed at the front end of the base 4 (FIG. 1). The slider corresponding to the slider 18 of the supporter 6 in FIG. 1 is integrally arranged at the rectangular rear half portion $28_1$ to $28_3$ of the harness supporter $6_1$ to $6_3$.

By applying the absorbing unit $26_2$ in FIGS. 6A, 6B, the casing 3 in FIG. 1 can be miniaturized in a height direction. By applying the absorbing unit $26_2$ in FIGS. 7A, 7B, the casing 3 in FIG. 1 can be miniaturized in a height direction and a length direction. The harness supporter $6_1$ of the absorbing unit $26_1$ can also be miniaturized comparing with the harness supporter 6 in FIG. 1, because the absorbing unit $26_1$ has no backward extending part having the slant surface 9. Therefore, the casing 3 can be miniaturized in the length direction.

In the embodiment in FIGS. 6A, 6B, two constant force springs $22_2$ are used, and the two reels $23_2$ are arranged in parallel in the front-rear direction. However, three or more constant force springs $22_2$ and three or more reels $23_2$ can be used according to the present invention. When a number of the constant force springs is "n", a width of each constant force spring $22_2$ may be 1/n of the width of the constant force spring $22_1$ in FIGS. 5A, 5B, and a spring force of each constant force spring $22_2$ may be 1/n of the spring force of the constant force spring $22_1$ in FIGS. 5A, 5B.

Similarly, in the embodiment in FIGS. 7A, 7B, two constant force springs $22_3$ wound and overlapped with each other on a reel $23_3$ are used. However, three or more constant force springs $22_3$ wound on the reel $23_3$ can be used according to the present invention. When a number of the constant force springs is "n", a width of each constant force spring $22_2$ may be 1/n of the width of the constant force spring $22_1$ in FIGS. 5A, 5B, and a spring force of each constant force spring $22_2$ may be 1/n of the spring force of the constant force spring $22_1$ in FIGS. 5A, 5B.

In the embodiments shown in FIGS. 5A, 5B, 6A, 6B, 7A, 7B, instead of the reel $23_1$ to $23_3$ having the upper and lower disks 23a, a reel (not shown) having inner shafts (not shown) and outer pivots $24_1$ to $24_3$ can be used.

In the embodiments in FIGS. 6A, 6B, 7A, 7B, two constant force springs $22_2$, $22_3$ having shorter width than that of the constant force spring of the embodiments in FIGS. 5A, 5B are used for miniaturizing the harness supporter. However, in the embodiment shown in FIGS. 6A, 6B, 7A, 7B, the two or more constant force springs $22_2$, $22_3$ having the width same as the constant force spring of the embodiments in FIGS. 5A, 5B can be used for enlarging the spring force.

Figure 8:
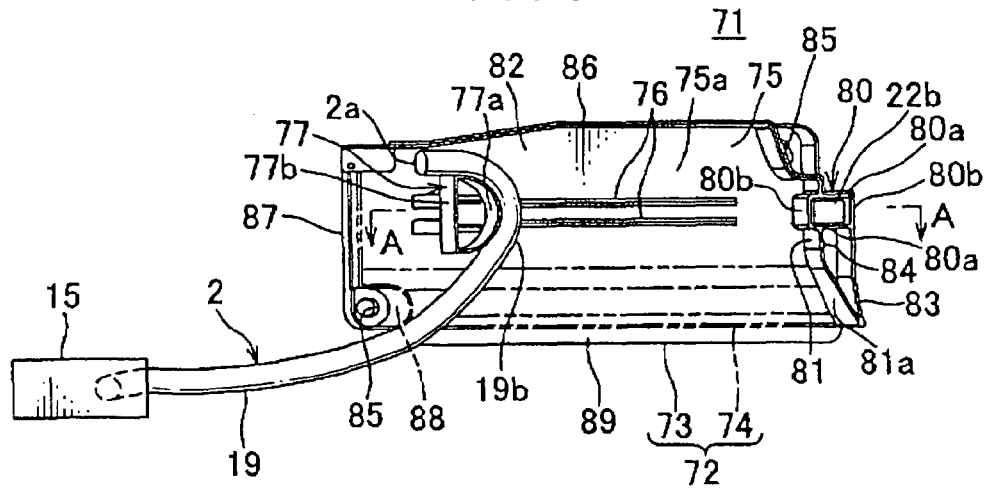
FIG. 8 is a perspective view of another embodiment of the power supply system according to the present invention.
Figure 9:
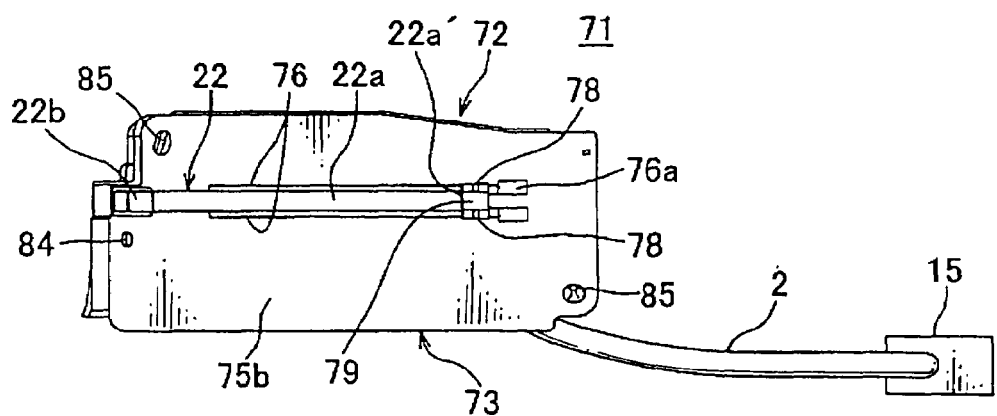
FIG. 9 is a perspective view of a rear side of the power supply system shown in FIG. 8.

FIGS. 8 to 10 show another embodiment of the power supply system according to the present invention.

This power supply system 71 is characterized in that the constant force spring 22 is disposed outside of a plastic casing 72 and is separated from the inner wiring harness 2, while in the embodiment shown in FIG. 1, the constant force spring 22 is disposed inside of the casing 3 together with the wiring harness 2.

FIG. 8 shows an inside of the casing 72 (a cover 74 at a near side is indicated by a chained line), and FIG. 9 shows an outside of the casing 72, namely, an outer surface of the base 73. In FIG. 8, a pair of horizontal slits 76 is extended in parallel in a longitudinal direction at the center in the height direction of a vertical base plate 75 of a base 73. Legs 78 of a half-circular harness support 77 respectively penetrate the slits 76. A vertical connecting plate 79 connects the legs 78 to each other at the outer surface side of the base 73 shown in FIG. 9. The end 22a' of the constant force spring 22 is fixed to the connecting plate 79. A winding part 22b of the constant force spring 22 is disposed at a front end of the base 73, and supported by pivots 24 perpendicular to upper and lower horizontal partition walls 80a at the front end of the base 73 (FIGS. 10A and 10B).

Figure 10A:
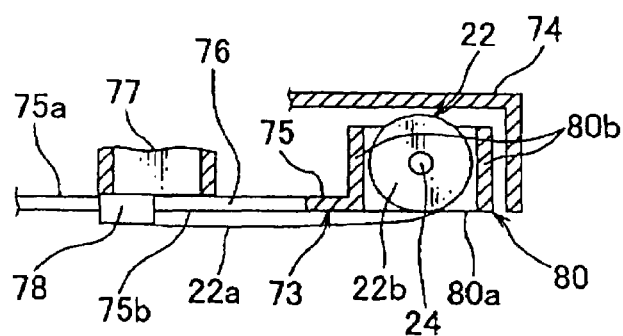
FIG. 10A is a cross-sectional view taken on line A-A of FIG. 8.
Figure 10B:
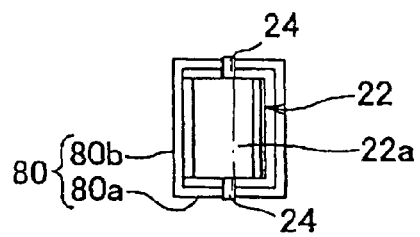
FIG. 10B is a front view of a winding part of the constant force spring.
Figure 11A:
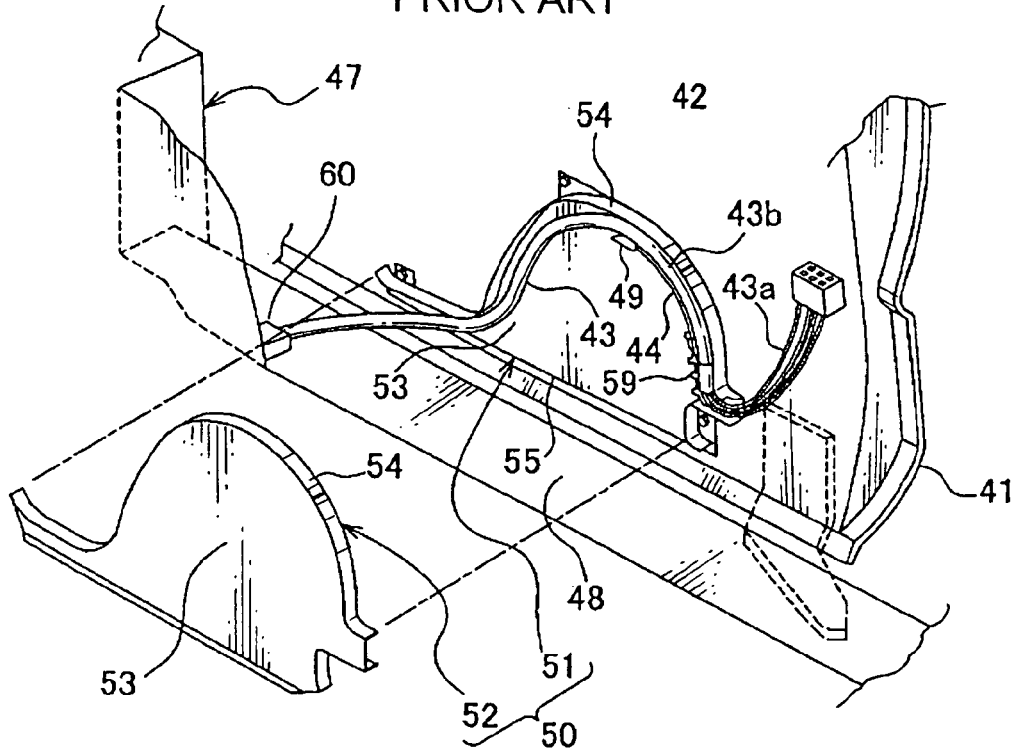
FIG. 11A is a perspective view of an embodiment of a conventional power supply system.
Figure 11B:
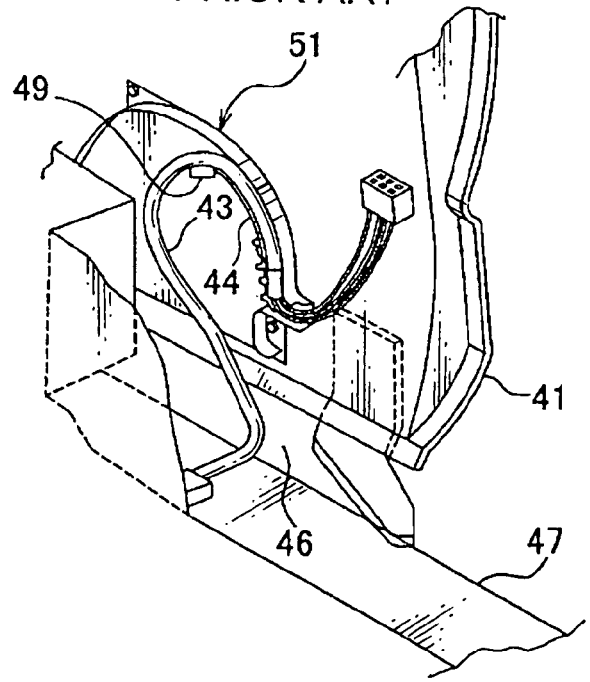
FIG. 11B is another perspective view of the conventional power supply system shown in FIG. 11A.

As shown in FIGS. 10A, 10B, the upper and lower partition walls 80a with left and right vertical partition walls 80b integrally compose a rectangular frame 80. This frame 80 is integrally formed on a front wall 81 of the base 73, and receives the winding part 22b of the constant force spring 22.

The frame 80 is projected forward from the front wall 81 for not to disturb the wiring harness 2 in a harness receiving space 82 in the casing 72. A lower half of the front wall 81 slants forward to form a sloping harness guide wall 81a. A vertical front wall 83 of the base 73 or a cover 74 is formed integrally with the front wall 81 at the front side of the front wall 81 with a gap. The front wall 81 intersects with the frame 80 to reinforce the frame 80. A hole 84 is provided in the gap on the bottom wall (base plate). This hole 84 and upper and lower holes 85 are used for fixing the power supply system 71 to the slide door (not shown). A front wall 83, an upper wall 86, and a rear wall 87 compose outer surrounding walls of the base 73. A horizontally long bottom opening 89 for leading out the wiring harness 2 is provided in between a circular harness stopping wall 88 surrounding the rear hole 85 and a sloping harness guide wall 81a at the front end of the base 73.

In the embodiment shown in FIG. 1, the winding part 22b of the constant force spring 22 is disposed inside of the harness supporter 6 for miniaturizing the power supply system 1. In the embodiment shown in FIG. 8, the frame 80 receiving the constant force spring 22 is disposed inside the sloping harness guide wall 81a to prevent the frame 80 from projecting outward (forward), thereby the power supply system 71 is miniaturized.

The harness supporter 77 at least includes a supporter main body 77 and a pair of horizontal legs 78. The supporter main body 77 includes a half-circular peripheral wall 77a and a vertical base wall 77b connecting both rear ends of the peripheral wall 77a to each other. The pair of legs 78 extends vertically from the base wall 77b, and connects the base wall 77b to the peripheral wall 77a. The pair of legs 78 penetrates a pair of slits 76 of the base 73, and slidably engaged with the slits 76. The supporter main body is slidably disposed along an inner wall 75a of the base plate 75 of the base 73. The end 22a' of the constant force spring 22 is fixed to the pair of legs 78 directly or via the connecting plate 79 using a screw or a hook. The legs 78 having a retaining flange is inserted into the slits 76 through wide parts 76a at the rear end sides of the slits 76.

A shape of the supporter main body 77 is not limited to the half-circular shape, but may be a circular shape or a rotatable pulley shape. An arc 77a for bending smoothly the wiring harness 2 is needed at an outside of the shape of the supporter main body 77. In case of the pulley shape, for example, one slit 76 is used, and a shaft (not shown) for rotating the pulley is slidably engaged with the slit 76. Further, the end 22a' of the constant force spring 22 is fixed to the connecting plate 79 connecting the base ends of the shaft. In the embodiment shown in FIG. 8, two slits 76 are used for allowing the supporter main body 77 to slide stably. However, only one slit 76 can be used as long as the slit 76 allows the supporter main body 77 to slide stably, and the end 22a' of the constant force spring 22 is stably fixed to a rear side of the supporter main body 77.

As shown in FIG. 9, a straight part 22a of the constant force spring 22 is arranged straight along a vertical outer wall (rear wall) 75b of the base 73, namely, a wall near a door inner panel of the slide door. A plate thickness of the straight part 22a corresponds to a plate thickness of the vertical base plate 75 of the base 73. A width direction of the straight part 22a corresponds to a height direction of the base 73. The straight part 22a is arranged at the outer wall 75b side of the base 73 along a moving track of the harness supporter 77.

FIGS. 8 and 9 show a complete close condition of the slide door. When the slide door is in a full-open condition, the straight part 22a is wound up due to the restoring force of the constant force spring 22 to move the harness supporter 77 to the front end of the slits 76. The action of the constant force spring 22 is similar to that in the embodiment shown in FIG. 1.

Incidentally, as is applicable in the embodiment shown in FIG. 1, when the slide door is in a half-open condition, the straight part 22a is wound up due to the restoring force of the constant force spring 22 to move the harness supporter 77 to the front end side of the slits 76 (FIG. 2), then, when the slide door is in a full-open condition, using the fixed end 2a as a fulcrum, the harness supporter 77 may be pushed and moved backward by the harness bend portion 19b of the wiring harness 2 against the spring force of the constant force spring 22. In this case, for smoothly moving the harness supporter 77 by pushing of the harness bend portion 19b of the wiring harness 22, sliding friction of the harness supporter on the slits 76 (FIG. 8) and the slider 18 (FIG. 1) should be reduced.

In the embodiment shown in FIG. 1, the end (fixed end) 22a' of the constant force spring 22 is disposed at a front end of the casing 3, and the winding part 22b is disposed at an inside of the harness supporter 6. However, in the embodiment shown in FIG. 8, adversely, the end (fixed end) 22a' of the constant force spring 22 is disposed at the harness supporter 77, and the winding part 22b is disposed at the front end of the casing 72. Functions in the embodiments shown in FIGS. 1 and 8 are the same.

In the embodiment shown in FIG. 8, the slits 76 are necessary for connecting the end 22a' of the constant force spring 22 and the harness supporter 77. However, like the embodiment shown in FIG. 1, it is possible that the horizontal guide groove 17 is provided for sliding the harness supporter, and a horizontal slit 76 is provided at a bottom of the guide groove 17 so that the legs 78 or the like connect the harness supporter 77 and the end 22a' of the constant force spring 22 via the slit 76.

The wiring harness 2 and the harness lock 15 in the embodiment shown in FIG. 8 are the same as those in the embodiment shown in FIG. 1. The wiring harness 2 is structured by covering the plurality of covered electric wires with the protection tube such as corrugate tube or the meshed tube. Like the embodiment shown in FIG. 1, the casing 72 may be installed not only vertically but also horizontally at the sliding door, and may be applied to the sliding objects other than the sliding door. The material of the constant force spring 22 is the same as that in the embodiment shown in FIG. 1. The constant force spring 22 may be structured by the spring unit 10 using the reel 23 (FIG. 3).

The structure shown in FIGS. 5 to 7 may be applied to the embodiment shown in FIG. 8. A plurality of constant force springs 22 overlapped with each other may be wired, separately wound at the frame (spring receiver) 80 of the case 72 and arranged in parallel back and force. Alternatively, a plurality of constant force springs 22 overlapped with each other may be wired, and integrally wound at the frame 80. Comparing with a case of using one constant force spring 22, in a case of using the number "n" of constant force springs 22, the constant force and the width are reduced to 1/n.

According to the embodiment shown in FIG. 8, the wiring harness 2 and the constant force spring 22 are separated from each other via the casing 72. Therefore, if the constant force spring 22 is broken, the wiring harness will not interfere with the crack or the fracture of the constant force spring 22. Thereby, the wiring harness is surely prevented from being damaged.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A power supply system comprising:
   a casing;
   a wiring harness;
   a harness supporter arranged along a base of the casing so as to move freely back-and-forth along a guide groove formed in the base of the casing; and
   a constant force spring arranged along the guide groove,
   wherein the wiring harness is bent and wired along an outer surface of the harness supporter, and the harness supporter is biased with a spring force by the constant force spring so as to absorb an extra length of the wiring harness, and
   wherein a winding part of the constant force spring is separated from a harness receiving space of the casing, and an end of the constant force spring, led from the winding part which is connected to the harness supporter, is fixed at a front side of the guide groove.

* * * * *